No. 742,759. PATENTED OCT. 27, 1903.
T. L. VALERIUS.
BOTTLE CARRIER FOR TESTERS.
APPLICATION FILED MAY 28, 1903.
NO MODEL.
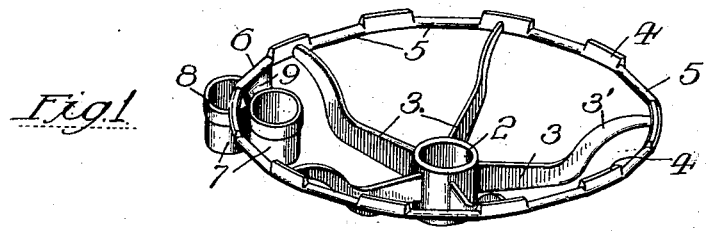
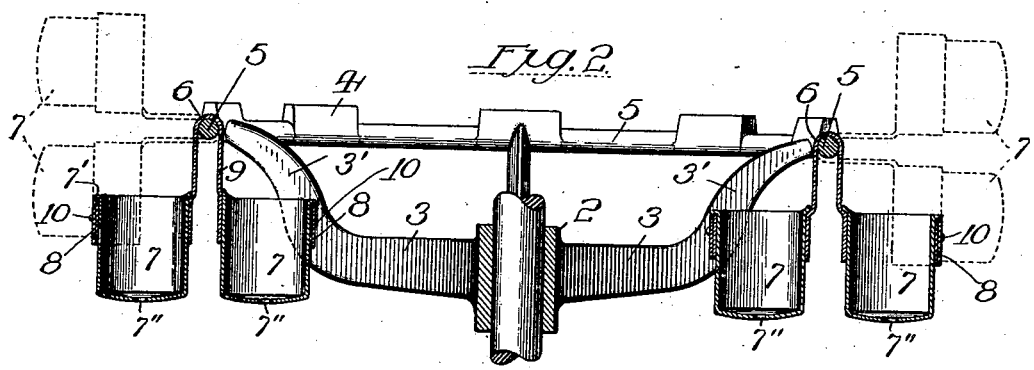
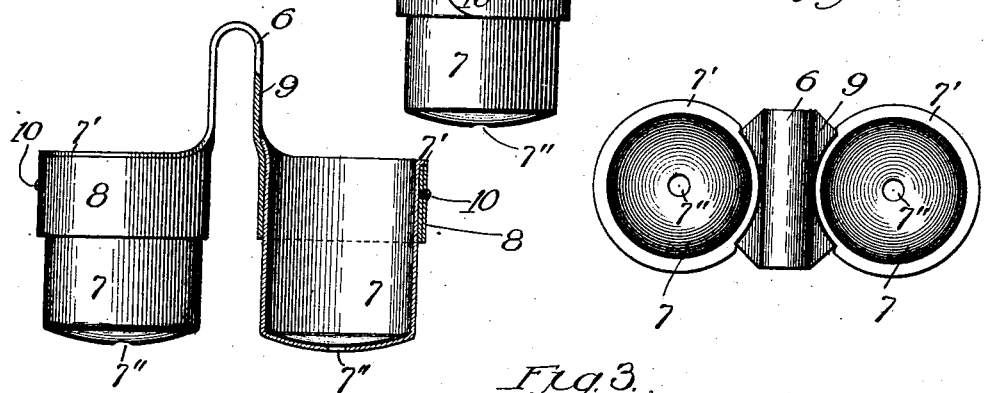
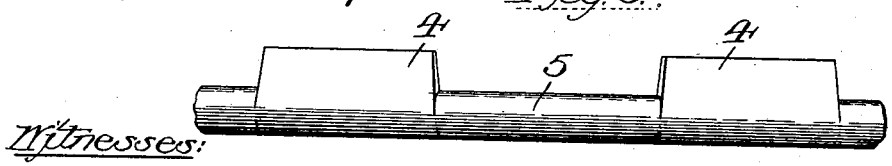
Witnesses:
Luther S. Alter
Edw. R. Burritt
Inventor
Theodore L. Valerius,
By C. W. Hawley
Attorney No. 742,759.

Patented October 27, 1903.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

BOTTLE-CARRIER FOR TESTERS.

SPECIFICATION forming part of Letters Patent No. 742,759, dated October 27, 1903.

Application filed May 28, 1903. Serial No. 159,126. (No model.)

*To all whom it may concern:*

Be it known that I, THEODORE L. VALERIUS, a citizen of the United States, and a resident of Fort Atkinson, in the county of Jefferson and State of Wisconsin, have invented a certain new, useful, and Improved Bottle-Carrier for Testers, of which the following is a specification.

My invention relates to machines for testing milk to determine the percentage of butter-fat contained therein; and my invention has special reference to centrifugal milk-testers. A power-actuated centrifugal milk-tester of the class to which my invention is specially applicable comprises a large casing that may be tightly closed and a bottle-carrier arranged therein and a steam-turbine or the like for rotating said carrier at a high speed. Said bottle-carrier is equipped with a number of pendent sockets or cups to hold the testing-bottles and which when the carrier is rotated swing outwardly into a horizontal plane, the bottles therein being held into place by centrifugal force. The machine is used in carrying out the well-known Babcock test, which consists in acidulating the milk to be tested and then subjecting the acidulated milk to sufficient centrifugal force to cause the separation of the fatty constituents of the milk from the heavier milk-serum. A large number of samples of milk are tested at the same time in such a machine, and as the carrier cannot easily be kept in balance and as the bottles with their contents are of considerable weight the carrier when rapidly rotated is subjected to severe strains that tend to rend it apart. It is necessary, therefore, that the carrier-wheel and all the parts attached thereto going to make up the bottle-carrier shall be strong and durable, and consequently it is quite the most costly part of a testing-machine; but testing-machines do not command high prices, and the tendency among manufacturers has been to use light cheap parts, with the result that their machines do not wear well and breakages are frequent. The principal difficulty has arisen from the spreading and twisting of the parts or members of the carrier-wheel proper and from the opening of the loops or hooks by which the bottle-holding cups are attached thereto. These weaknesses put a practical limit upon the rotative speed of the old-style carriers; and the primary object of my invention is to provide a bottle-carrier which shall be very cheap, light, and yet strong and durable, so that it may be rotated much more rapidly without damage of breaking.

Another object of my invention is to provide a carrier extremely convenient in use; and the particular object of my invention is to provide a bottle-carrier that shall be composed wholly of cast and sheet metal parts of minimum weight and which may be manufactured and assembled with the least expenditure of labor.

Another object of my invention is to reduce the number of parts that have hitherto been considered essential to the makeup of a bottle-carrier of a centrifugal testing-machine; and still another object of my invention is to provide bottle-pendants of uniform weight and to provide a bottle-carrier wherein the bearing or connection between the carrier-wheel or spider and each pendant or bottle-cup shall be wider or of greater extent than heretofore, with a view to distributing the weight and strain of the pendant upon the carrier-wheel, and thus increasing the strength and durability of each connection.

My invention consists generally in a bottle-carrier for centrifugal milk-testing machines which comprises a metal wheel provided with a rim or tire that is made up of alternate lugged and straight sections in combination with a plurality of bottle pendants or cups swung from said straight sections and each comprising a wide metal yoke and one or more bottle-holding cups or thimbles.

My invention consists, further, in various details of construction and in combinations of parts, all as hereinafter described, and particularly pointed out in the claims.

The invention will be more readily understood by reference to the accompanying drawings, forming a part of this specification, and in which—

Figure 1 is a perspective view of a bottle-carrier embodying my invention. Fig. 2 is an enlarged vertical section thereof, all but two of the pendants being removed from the wheel of the carrier. Fig. 3 is a still further enlarged view of a part or section of the carrier-rim. Fig. 4 is a plan view of a pendant. Fig. 5 is a side view thereof, one of the cups being shown in section; and Fig. 6 is an end view of the pendant.

As shown in the drawings, my novel bottle-carrier comprises a strong metal wheel or ring and a plurality of equally strong bottle-carrying pendants of uniform weight that hang from the periphery or rim of the wheel and are evenly spaced around the same. For convenience of illustration I have indicated the relations and positions of all the pendants by a single pendant in Fig. 1 and two in Fig. 2. It will be understood that all of the spaces upon the wheel are usually occupied by pendants, though a single wheel with a single pendant constitutes a complete operative device for making a milk-test, the presence of means for spinning the wheel being assumed. The carrier-wheel is a single casting, preferably, and comprises the hub 2, the spokes 3, and the wheel-rim, which last comprises the lugged portions 4 and the straight portions 5. The lugged and straight portions 4 and 5 together constitute a continuous ring or rim having great strength to resist the outward stretching strains. The straight portions are substantially circular in cross-section and each serves as the pivot or journal shaft for a bottle-carrying pendant. The straight portions of the wheel may and are preferably longer than the lugged portions, which latter serve to separate the pendants upon the wheel. Each pendant comprises a sheet-metal yoke 6 and two bottle cups or thimbles 7 7, arranged in said yoke. The yoke is made up of the two collars 8 8 and the intermediate and upwardly-extending loop 9, which is wide enough to fill the space between the two lugs 4 on the wheel and which fits the round straight portion 5 thereof. The parts 8 8 and 9 are formed from a single blank, the ends of the collars being secured by rivets 10. The bending of the blank to form the collars 8 8 gives sufficient curve to the sides of the loop 9 to make the yoke very strong, though of slight weight. The cups or thimbles 9 are pressed or spun from sheet metal and are driven or pressed through the collars of the yoke. The form attachment of the thimbles to the yoke is further insured by peening or flanging the edges 7' of the cups over the edges of the collars 8, as shown in Figs. 2, 4, 5, and 6. The cups are preferably provided with drain-holes 7'' in their bottoms. It will be noted that although the lower parts of the yoke are curved the top of the loop 9 is straight and fits perfectly upon the straight portion 5 of the carrier-wheel. The weight of the pendant and of the two bottles which are placed therein is thus well distributed upon the rim of the carrier-wheel, and the bearing is so extensive that the parts will wear indefinitely.

My bottle-carrier, though composed of parts having small dimensions and which are of little weight, possesses ample strength and is extremely durable. It is also more convenient to use than others, as the pendants may be easily removed or placed upon the wheel without special care being taken to place, seat, and pivot them upon the wheel, an operation which with other machines requires considerable time. It is well known that a bottle-carrier of the old style can not be rotated at a speed exceeding one thousand revolutions per minute without danger of disruption. At this speed the separation of the butter-fat in the milk is incomplete, not more than seventy per cent. thereof being shown. As contrasted therewith my invention admits of fully twice this speed and enables me to secure results that equal those of a gravimetric laboratory test.

As numerous modifications of my invention will readily suggest themselves to one skilled in the art, I do not confine my invention to the specific constructions herein shown and described.

Having thus described my invention, I claim as new and desire to secure by Letters Patent—

1. In a bottle-carrier, for centrifugal milk-testing machines, a metal wheel provided with a rim that is made up of alternate lugged and straight sections, in combination with a plurality of bottle pendants or cups swung from said straight sections and each comprising a wide metal yoke and one or more bottle-holding cups or thimbles, substantially as described.

2. A bottle-carrier wheel comprising a suitable hub and spokes and an integral, continuous rim provided with straight sections to receive the bottle-carrier cups, substantially as described.

3. The bottle-carrier wheel for testing-machines, comprising a suitable hub and spokes, in combination with a continuous rim having straight sections that are circular in cross-section, substantially as described.

4. The bottle-carrier wheel for testing-machines comprising a suitable hub and spokes, in combination, with a continuous rim having straight sections that are circular in cross-section and said rim being provided with lugs at the ends of said straight portions, substantially as described.

5. In a bottle-carrier, the combination of the wheel provided with a continuous metal rim, spaced or divided with integral lugs, in combination with a plurality of bottle-pendants, swung from the sections of the rim between said lugs, substantially as described.

6. In a bottle-carrier for testing-machines, the combination, of the wheel provided with a rim composed of straight and lugged sections, said straight sections being substantially circular in cross-section and the twin cups joined by a yoke that is swiveled upon one of said sections, substantially as described.

7. A bottle-carrier for testing-machines comprising a wheel having alternate lugged and straight sections, together forming a solid ring, in combination with a plurality of pendants swung from said straight sections, substantially as described.

8. In a bottle-carrier for testers, a ring, having alternately straight and lugged sections, combined with a plurality of bottle-carrying pendants, each having two ring portions, 8, 8, and a loop 9 integral therewith, each said loop being adapted to fit a straight section on said ring and being of substantially the same length, substantially as described.

9. In a pendant, the combination of cups for holding bottles, having the flanged edges or rims 7', with a loop, 9, having integral rings 8 joined by rivets 10, said rings rigidly inclosing said cups, substantially as described.

10. In a pendant for testing-machines, in combination, the cups or thimbles 7, the rings 8, and the loop 9, integral with said rings, substantially as described.

11. A pendant for testing-machines, comprising one or more cups, a strap surrounding each cup, and a suspension-loop integral with said straps, said straps and loop being made from a single piece of sheet metal, substantially as described.

12. A bottle-carrier for testers, comprising a ring having alternately straight and lugged sections, in combination with a plurality of bottle-carrying pendants, each suspended from a straight section of said ring by a sheet-metal yoke of substantially the same width as said straight section, substantially as described.

In testimony whereof I have hereunto set my hand, this 21st day of May, 1903, at Chicago, Illinois, in the presence of two witnesses.

THEODORE L. VALERIUS.

Witnesses:
F. J. MACNISH,
C. G. HAWLEY.